United States Patent
Luxenberg et al.

(10) Patent No.: US 9,549,019 B2
(45) Date of Patent: Jan. 17, 2017

(54) MANAGING A LOGICAL CLIENT FOR A VIRTUAL MACHINE

(71) Applicant: Red Hat Israel, Ltd., Raanana (IL)

(72) Inventors: Roni Luxenberg, Raanana (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 284 days.

(21) Appl. No.: 13/737,340

(22) Filed: Jan. 9, 2013

(65) Prior Publication Data

US 2014/0195590 A1    Jul. 10, 2014

(51) Int. Cl.
*H04L 29/08*    (2006.01)
*G06F 9/54*    (2006.01)
*G06F 15/16*    (2006.01)

(52) U.S. Cl.
CPC ............. *H04L 67/025* (2013.01); *G06F 9/547* (2013.01); *H04L 67/08* (2013.01)

(58) Field of Classification Search
CPC .. G06F 9/45537; G06F 9/547; G06F 9/94411; H04L 67/025; H04L 67/08
USPC .......... 709/203, 208, 226; 711/162; 719/310
See application file for complete search history.

(56) References Cited

U.S. PATENT DOCUMENTS

| | | | |
|---|---|---|---|
| 6,327,613 B1* | 12/2001 | Goshey et al. | 709/208 |
| 6,678,068 B1 | 1/2004 | Richter et al. | |
| 6,789,111 B1* | 9/2004 | Brockway et al. | 709/222 |
| 7,975,017 B1* | 7/2011 | Kuzkin et al. | 709/208 |
| 2007/0288227 A1 | 12/2007 | Kim et al. | |
| 2008/0168158 A1* | 7/2008 | Bantz et al. | 709/219 |
| 2009/0043921 A1 | 2/2009 | Roy | |
| 2009/0094604 A1* | 4/2009 | Sakai | 718/1 |
| 2009/0216975 A1* | 8/2009 | Halperin et al. | 711/162 |
| 2011/0225513 A1 | 9/2011 | Lauwers et al. | |
| 2012/0209923 A1 | 8/2012 | Mathur et al. | |

FOREIGN PATENT DOCUMENTS

WO    2010117369    10/2010

OTHER PUBLICATIONS

USPTO, Office Action for Application No. 13/737,398 (L236) mailed Jun. 26, 2015.
USPTO, Final Office Action for Application No. 13/737,398 (L236) mailed Dec. 29, 2015.
USPTO, Advisory Action for Application No. 13/737,398 (L236) mailed Feb. 29, 2016.

* cited by examiner

*Primary Examiner* — Emmanuel L Moise
*Assistant Examiner* — Zi Ye
(74) *Attorney, Agent, or Firm* — Lowenstein Sandler LLP

(57) ABSTRACT

A logical client includes a primary client device and one or more secondary client devices. Each of the secondary client devices may be coupled to one or more peripherals. The primary client in the logical client may use a virtual machine (VM) and/or an application that uses one or more peripheral devices. The primary client device may not be coupled to the one or more peripheral devices used by the application and/or the VM. The primary client device may access the peripheral devices coupled to secondary client devices in order to use the application and/or the VM.

21 Claims, 7 Drawing Sheets

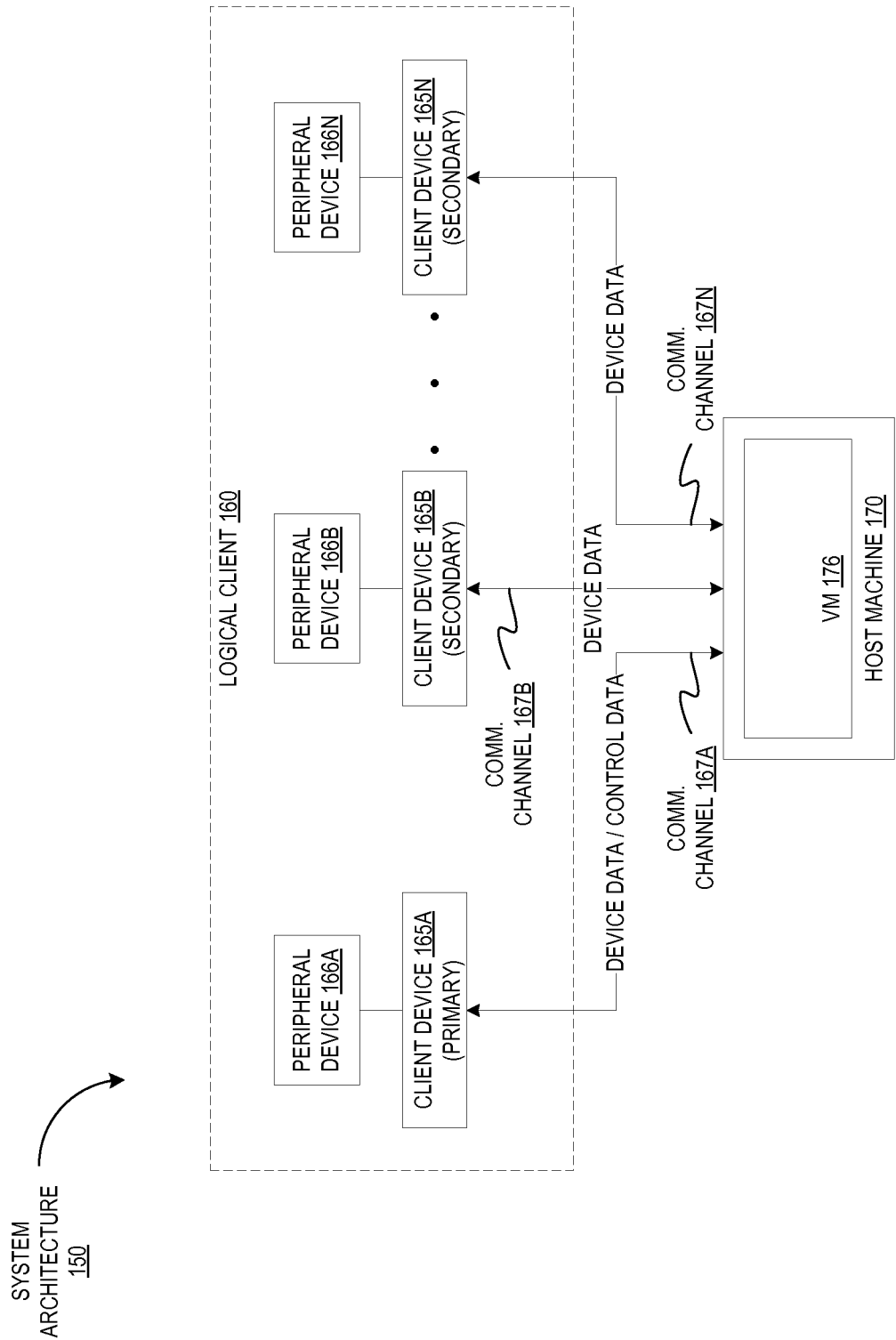

MANAGING A LOGICAL CLIENT FOR A VIRTUAL MACHINE

CROSS-REFERENCE TO RELATED APPLICATIONS

The present application is related to co-filed U.S. patent application Ser. No. 13/737,398 entitled "MANAGING A LOGICAL CLIENT FOR AN APPLICATION.", which is assigned to the assignee of the present application.

TECHNICAL FIELD

This disclosure relates to the field of virtual machines and, in particular, to using and/or managing a logical client for a virtual machine.

BACKGROUND

Many network architectures use virtual machines (VMs) and physical machines (e.g., a desktop computer, a server computer, a computing device, etc.) to perform various functions and tasks. A virtual machine (VM) is a software implementation of a machine (computer) that includes its own operating system (referred to as a guest operating system) and executes application programs. Both the VMs and physical machines may be used by client devices to perform certain operations, functions, and/or actions. For example, a client may use an application installed on a physical machine to check email, host a video conference, etc. In another example, a client device may access a virtual desktop environment on a VM and may use the VM to perform task (e.g., use a word processing application to type up a document, browse the internet using a web browser, etc.).

The VMs and/or applications may use different peripheral devices to perform various functions and/or operations. For example, the VM may use a virtual printer to print documents and/or may use a virtual CD-ROM drive to access data. In another example, an application may be a video conference application that uses a video camera (e.g., a web camera) to particulate in video conferences. The VMs and/or applications may use peripheral devices that are coupled to the client devices in order to perform the various functions and/or operations.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 1B is a block diagram illustrating a second example system architecture in which some embodiments of the disclosure may operate.

DETAILED DESCRIPTION

Embodiments of the invention provide a mechanism for managing a logical client that uses a VM and/or an application on a host machine. The logical client may include multiple client devices, each client device coupled to one or more peripheral devices (e.g., a CD-ROM drive, a video camera, a card reader, etc.). One of the client devices in the logical client may be a primary client device and the other client devices may be secondary client devices. The primary client device may control, access, and/or use the VM and/or application. The VM and/or the application may use peripheral devices that are not coupled to the primary client device. In order to provide the VM and/or application with access to the peripheral devices, the primary client device may use peripheral devices that are coupled to the secondary client devices. This may allow the primary client device to use the VM and/or application even though the primary client device is not directly coupled to the peripheral devices used by the VM and/or application.

In one embodiment, the primary client device may forward data between the secondary client devices (and their corresponding peripheral device) and the VM and/or application. In another embodiment, each of the client devices in the logical client may communicate data with the VM and/or the application. The illustrations and following descriptions reference a single peripheral device at each client device for ease of discussion and are not meant to be limited to embodiments of the disclosure. For example, a client device may be coupled to multiple peripheral devices.

Figure 1A:
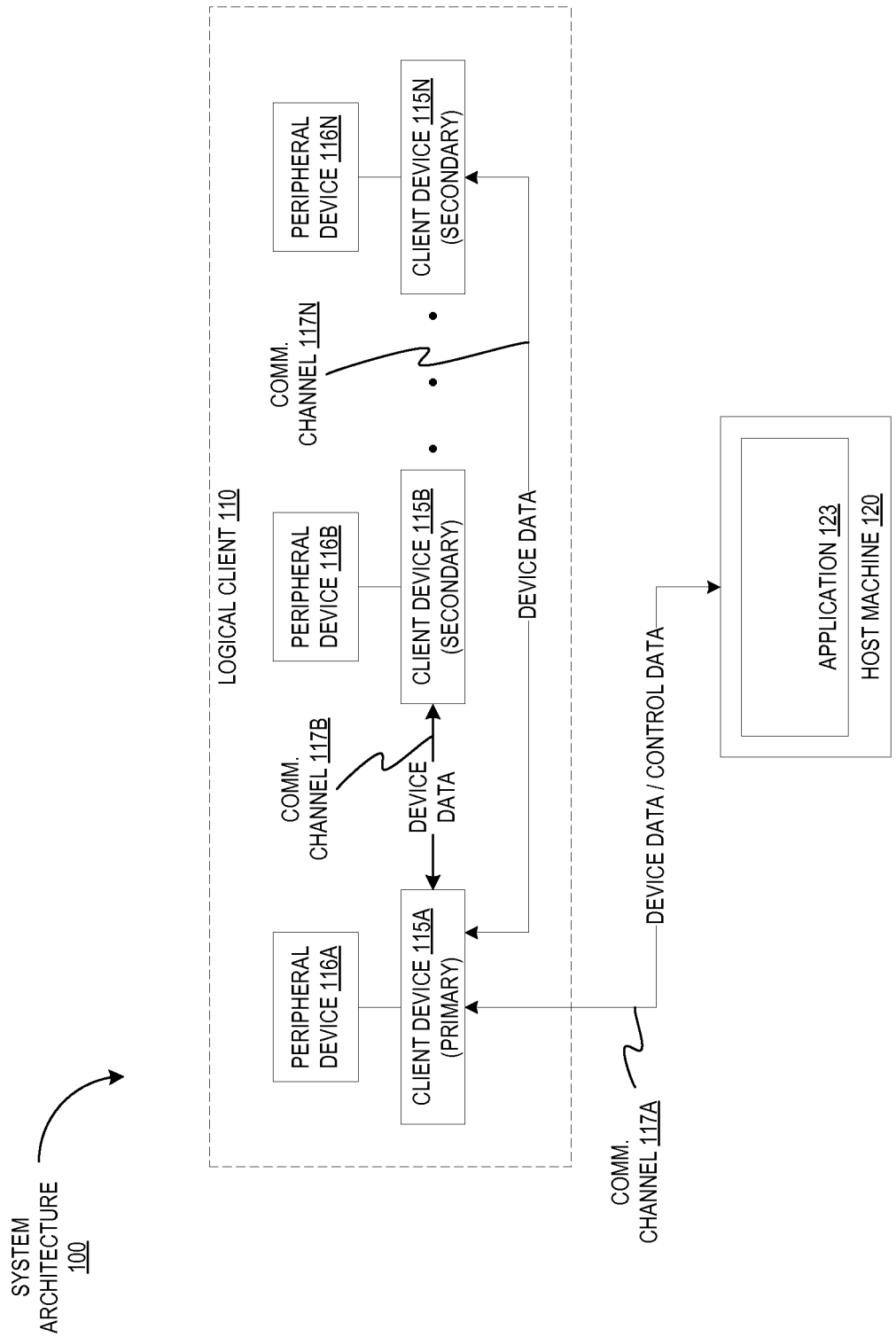
FIG. 1A is a block diagram illustrating a first example system architecture in which some embodiments of the disclosure may operate.

FIG. 1A is a block diagram illustrating a first example system architecture 100 in which some embodiments of the disclosure may operate. The system architecture 100 includes, but is not limited to, client devices 115A through 115N communicatively coupled to a host machine 120. Each client device 115A through 115N is coupled to a corresponding peripheral device 116A through 116N. For example, client device 115A is coupled to the peripheral device 116A. The host machine 120 includes an application 123. The application 123 may be a software application, a software module, a program, a service, a daemon, a process, etc., that resides on the host machine 120. The application 123 may be used by a client device, such as client device 115A, to perform various functions, operations, actions, and/or tasks. For example, the application 123 may be an email application that allows a user of the client device 115A to receive or send email. In another example, the application 123 may be a video conference application that allows a user to participate in video conferences.

In one embodiment, the peripheral devices 116A through 116N may be devices or components that are coupled or connected to client device 115A through 115N, but may not be part of the client devices 115A through 115N. The peripheral devices 116A through 116N may be any device and/or component that expands and/or extends the capabilities, operations, and/or functionalities of the client devices 115A through 115N, but do not form part of the core device architecture for the client devices 115A through 115N. For example, the peripheral device 116A may be a web camera, the peripheral device 116B may be a CD-ROM drive, and the peripheral device 116N may be a printer. The peripheral devices 116A through 116N may be coupled to the corresponding client device 115A through 116N via a wired connection (e.g., a USB connection) and/or a wireless connection (e.g., a Bluetooth connection).

In one embodiment, the client device 115A is part of a logical client 110 that also includes client devices 115B through 115N. The logical client 110 may be a logical grouping or association between the client devices 115A through 115N. The client device 115A may be a primary client device. The primary client device may be a master or main client device that may control, access, and/or use the application 123. For example, the client device 115A may provide the user input (e.g., keyboard and/or mouse inputs) to the application 123 and the client device 115A may also display data (e.g., display an application window with graphics, images, and/or text) received from the application 123. Although the client device 115A may not be directly coupled to physical peripheral device that corresponds to the one or more peripheral devices used by the application 123, the client devices 115B through 115N may be coupled to physical peripheral devices (e.g., peripheral devices 116B through 116N) that correspond to the one or more peripheral devices used by the application 123. The primary client device 115A communicates data, such as device data and/or control data, with the application 123 via the communication channel 117A. The primary client device 115A may also communicate device data with the client devices 115B through 115N via communication channels 117B through 117N.

Device data may include data that is used to access and/or control a peripheral device and may also include data that is transmitted to and/or received from a peripheral device. For example, device data may be a command instructing a peripheral device to perform an action and/or a function (e.g., a command to a CD-ROM drive to read portion of a compact disc). In another example, device data may be video data that is received from a video camera (e.g., a peripheral device). In a further example, device data may be data, such as a file, that is written to and/or read from a USB flash drive (e.g., a peripheral device). Control data may include data that is used to manage, access, and/or control the application 123. For example, the control data may be data indicating that a user wants to perform a certain function, operation, and/or action using the application 123 (e.g., check email, authenticate a user, start a video conference, etc.).

In one embodiment, the client devices 115B through 115N may be secondary client devices (e.g., slave client devices). A secondary (or slave) client device may be a client device that does not control or access the application 123, but allows a primary client device 115A to use one or more peripheral devices that are couple to the secondary client device. By grouping or associating the client devices 115A through 115N into the logical client 110, the primary client device 115A may be able to communicate with, access, and/or use the peripheral devices 116B through 116N as if the peripheral devices 116B through 116N were directly coupled to the primary client device 115A. This may allow the primary client device 115A to use the application 123, even though the primary client device 115A is not directly coupled to a corresponding physical peripheral device that is used by the application 123. The logical client 110 (e.g., the collection of client devices 115A through 115N) may act as a single logical client that may provide the application 123 with access to the peripheral devices 116A through 116N.

In one embodiment, the primary client device 115A may access the peripheral devices 116B through 116N by communicating with the corresponding secondary client devices 115B through 115N via communication channels between the secondary client devices 115B through 115N and the primary client 115A. For example, to access peripheral device 116B, the client 115A may communicate with peripheral client device 115B via communication channel 117B. The primary client device 115A may send and/or receive device data to one or more of the peripheral devices 116B through 116N via the communication channels 117B through 117N.

In one embodiment, the primary client device 115A may use, access, and/or manage the application 123. The application 123 may also use one or more peripheral devices that are not directly coupled to the primary client device 115A. For example, the application 123 may be a video conferencing application that uses a web camera and a fingerprint reader to authenticate a user. The primary client device 115A may not be directly coupled to a web camera and/or a fingerprint reader. However, the peripheral device 116B may be a web camera that is coupled to the secondary client device 115B and the peripheral device 116N may be fingerprint reader that is coupled to secondary client device 115N. The primary client device 115A may access the web camera (e.g., peripheral device 116B) that may be coupled to a secondary client device 115B and may access the fingerprint reader (e.g., peripheral device 116N) that may be coupled to the client device 115N. The primary client device 115A may receive device data (e.g., video or image data) from the peripheral device 116B via the secondary client device 115B and may also receive additional device data (e.g., a scan of a user's fingerprint) from the peripheral device 116N via the secondary client device 115N. In another example, the application 123 may be a map application that uses a GPS device to provide a user with directions to a location. The client device 115A may not be directly coupled to a GPS device. However, the peripheral device 116B may be GPS receiver that is coupled to the secondary client device 115B. The application 123 may access the GPS device (e.g., peripheral device 116B) that may be coupled to a secondary client device 115B by communicating with the secondary client device 115B via communication channel 117B between the secondary client device 115B and the primary client device 115A. The application 123 may receive device data (e.g., GPS or location data) from the peripheral device 116B via the secondary client device 115B. This may allow the primary client device 115A to use the application 123 (e.g., the map application) even though the primary client device 115A is not directly coupled to a GPS device.

In one embodiment, the application 123 may not be aware that the primary client device 115A is not directly coupled to one or more peripheral devices that are used by the application 123 because the primary client device 115A is the only client that communicates with the application 123 (and the secondary client devices 115B through 115N communicate device data to the primary client device 115A).

FIG. 1B is a block diagram illustrating a second example system 150 architecture in which some embodiments of the disclosure may operate. The system architecture 150 includes, but is not limited to, client devices 165A through 165N communicatively coupled to a host machine 170. Each client device 165A through 165N is coupled to a corresponding peripheral device 166A through 166N. The host machine 170 includes a virtual machine (VM) 176 (e.g., a software implementation of a physical machine or computer that includes its own operating system and executes application and/or programs). In one embodiment, the peripheral devices 166A through 166N may be devices or components that are connected to client devices 165A through 165N, but may not be part of the client devices 165A through 165N. The peripheral devices 166A through 166N may be coupled to the corresponding client device 165A through 166N via a wired connection (e.g., a USB connection) and/or a wireless connection (e.g., a Bluetooth connection).

The client device 165A may access the VM 176 and the VM 176 may provide a virtual computing device for the client device 165A. From the user's point of view, the virtual computing device may function as a physical computing device (e.g., a personal computer) and is indistinguishable from a physical computing device. The VM 176 may use one or more virtual peripheral devices (e.g., a virtual CD-ROM, a virtual web camera, etc.). However, the client device 165A may not be coupled to physical peripheral device that corresponds to the one or more virtual peripheral devices. For example, the VM 176 may include a virtual CD-ROM drive and a virtual printer but the client device 165A may not be directly coupled to a physical CD-ROM drive and/or a physical printer. When, the client device 165A is not grouped into a logical client (e.g., a logical grouping or association of multiple client devices) the client device 165A may not be able to use the virtual CD-ROM and/or the virtual printer because the client device 165A is not coupled to a corresponding physical CD-ROM drive and a corresponding physical printer.

In one embodiment, the client device 165A is part of a logical client 160 that also includes client devices 165B through 165N. The logical client 110 may be a logical grouping or association between the client devices 165A through 165N. The client device 165A may be a primary client device. The primary client device may be a master or main client device that may control, access, and/or use the VM 176. Although the client device 165A may not be directly coupled to physical peripheral device that corresponds to the one or more virtual peripheral devices on the VM 176, the client devices 165B through 165N may be coupled to physical peripheral devices (e.g., peripheral devices 166B through 166N) that correspond to the one or more virtual peripheral devices on the VM 176. The primary client device 165A communicates (e.g., sends and/or receives) data, such as device data and/or control data, with the VM 176 via the communication channel 167A. The secondary client devices 162B through 165N may communicate device data with the VM 176 via communication channels 167B through 167N. Device data may include data that is used to access and/or control a peripheral device and may also include data that is transmitted to and/or received from a peripheral device. Control data may include data that is used to access and/or control the VM 176. For example, control data may be user input from a mouse and/or keyboard indicating that a user has initiated execution of an application on the VM 126. In another example, control data may be user input from a mouse indicating that a user has selected a folder in a desktop environment of the VM 126.

In one embodiment, the client devices 165B through 1665N may be secondary client devices. A secondary client device may be a client device that does not control or access the VM 176, but allows the primary client device 165A to use one or more peripheral devices that are couple to the secondary client device. For example, when the VM 176 may include a virtual web camera and the primary client device 165A may not be directly coupled to a web camera.

When the primary client device 165A access or uses the virtual web camera on the VM 176, the VM 176 may use a physical web camera (e.g., peripheral device 166B) that is coupled to the secondary client device 165B. The primary client device 165A may communicate with, access, and/or use a peripheral device (e.g., peripheral device 166B) coupled to a secondary client device (e.g., client device 165B) as if the peripheral device were directly coupled to the primary client device 165A. This may allow the client device 165A to use virtual peripheral devices on the VM 176, even though the client device 165A is not directly coupled to a corresponding physical peripheral device. The logical client 160 (e.g., the collection of client devices 165A through 165N) may act as a single logical client that may provide the VM 176 with access to the peripheral devices 166A through 166N.

Each of the client devices 165A through 165N is coupled to the host machine 170 via a communication channel. The VM 176 may be aware that the peripheral devices used by the VM 176 are not directly coupled to the primary client device 165A, because the VM 176 is receiving device data from the secondary client device 165B through 165N via communication channels 167B through 167N.

Figure 2:
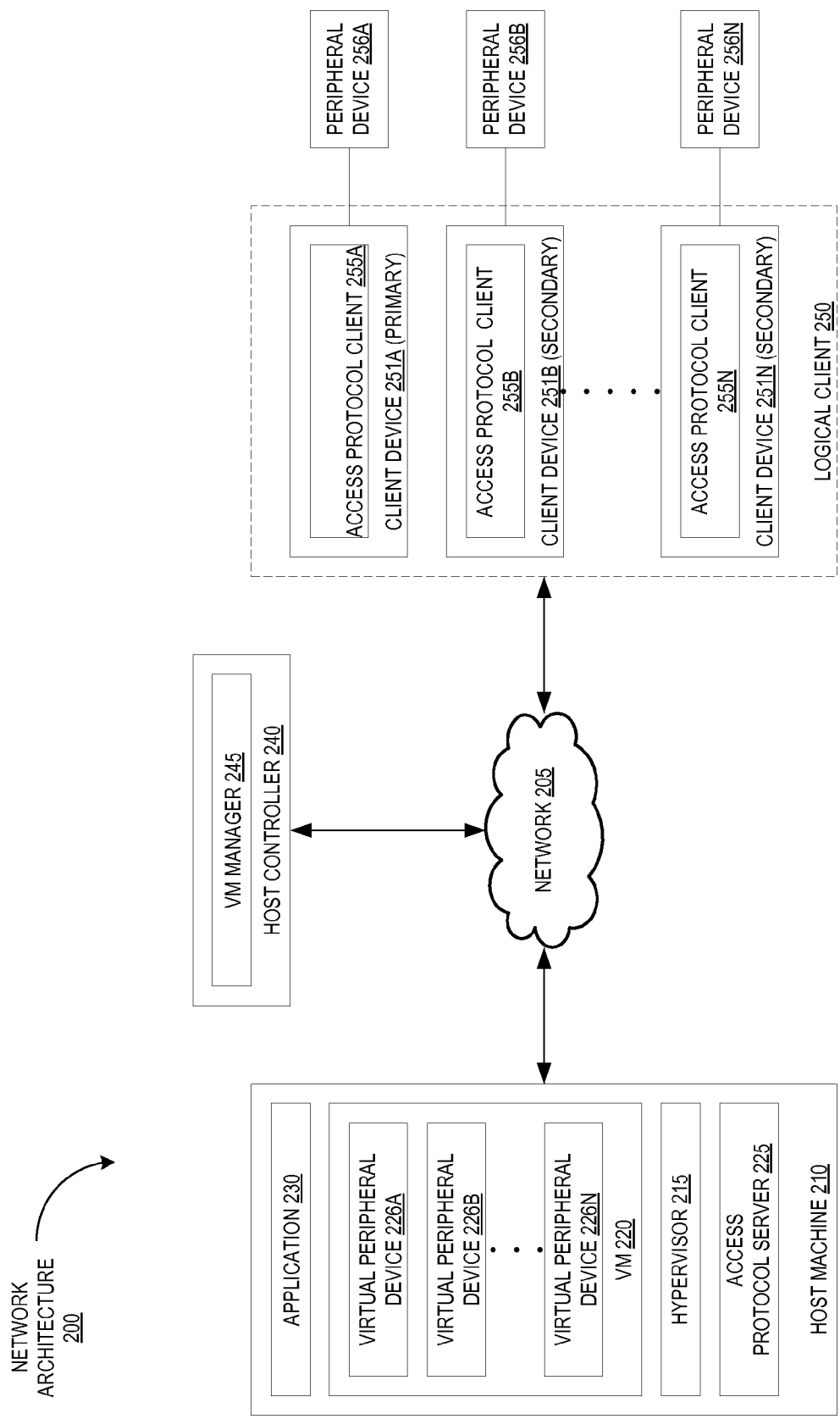
FIG. 2 is a block diagram illustrating a network architecture in which embodiments of the disclosure may operate.

FIG. 2 is a block diagram illustrating a network architecture 200 in which some embodiments of the disclosure may operate. The network architecture 200 includes, but is not limited to, client devices 251A through 251N communicatively coupled to a host machine 210 and a host controller 240 over a network 205. The network 205 may be one or more of a private network (e.g., a local area network (LAN), a wide area network (WAN), intranet, etc.), a wireless network (e.g., a Wi-Fi network, such as an 802.11n network), a cellular network (e.g., a Long Term Evolution (LTE) network), and/or a public network (e.g., the Internet).

Each client device 251A through 251N may be a computing device, such as a desktop computer, a laptop computer, a mainframe computer, a server computer, a personal digital assistant (PDA), smart phone, a netbook computer, a tablet computer, etc. Each client device 251A through 251N is coupled to a corresponding peripheral device 256A through 256N. In one embodiment, each client device 251A through 251N may be directly coupled to a corresponding peripheral device 256A through 256N. The peripheral devices 256A through 256N may be coupled to the client devices 251A through 251N via a wired and/or a wireless connection. For example, the peripheral device 251A may be coupled to the client device 251A via a Bluetooth connection, a Wi-Fi connection, a radio connection, a USB connection, an Ethernet connection, a FireWire, a serial AT attachment (SATA) connection, a parallel port connection, a serial port connection, etc.

The peripheral devices 256A through 256N may be any device and/or component that expands and/or extends the capabilities, operations, and/or functionalities of the client devices 251A through 251N, but do not form part of the core device architecture for the client devices 251A through 251N. For example, the peripheral device 256A may be a separate component coupled to the client device 251A via a physical cable and is not located within the client device 251A (e.g., an external hard drive coupled to the client device 251A but not located within a casing or a housing of the client device 251A). In another embodiment, the peripheral devices 256A through 256N may be devices or components that are part of the client devices 251A through 251N. For example, the peripheral device 256B may be a compact disc Read-only memory (CD-ROM) drive that is part of the client device 251B. Examples of peripheral devices include, but are not limited to, a global positioning system (GPS) device, expansion cards, graphics cards, printers (e.g., laser printers), image scanners, storage drives (e.g., tape drives, universal serial bus (USB) drives, flash drives, internal/external hard drives, etc.), microphones, speakers, video cameras (e.g., web cameras), digital cameras, mice, keyboards, touch pads, touch screens, smart card readers, fingerprint readers, memory card readers, etc. In one embodiment, a peripheral device may not include a monitor or a display device. For example, a peripheral device may be a smart card reader, a USB drive or another device that does not include a cathode ray tube (CRT) monitor or a liquid crystal display (LCD).

The host machine 210 includes an application 230. The application 230 may be an application that is used by one or more of the client devices 251A through 251N. For example, the application 230 may be an email application that allows a user to check email. In another example, the application 230 may be a video conference application that allows a user to host a video conference. In a further example, the application 230 may be an authentication service that authenticates a user's credentials (e.g., username, password, fingerprint, one-time-password, smartcard, etc.). The application 230 may be a service, application, software module, and/or software component that may be executed by the host machine 210.

The host machine 210 also includes a VM 220. The VM 220 may be a software implementation of a physical machine (computer) that includes its own operating system (referred to as a guest OS) and executes application programs. The host machine 210 allocates a certain amount of its resources to the VM 220 and/or additional VMs (not shown in the figure). The host machine 210 may multiplex its underlying hardware platform among the VMs. Each virtual machine is then able to use the allocated resources to execute its guest operating system and applications. In one embodiment, the VM 220 hosts or maintains a virtual desktop environment for remote clients, including client device 251A. The virtual desktop environment can represent an output, such as virtual machine graphical user interface (e.g., an image or UI to be displayed in order to represent the VM 220 at the client device 251A), generated by a desktop application running within virtual machine 220. Graphics data associated with the virtual desktop can be captured and transmitted to client device 251A, where the virtual machine GUI (i.e., virtual desktop environment) may be rendered by a rendering agent and presented by a client application.

The VM 220 includes virtual peripheral devices 226A through 226N. The virtual peripheral devices 226A through 226N may allow a user to perform functions, actions, and/or operations using the VM 220. For example, the virtual peripheral device 226N may be a web camera that allows the VM 220 to participate in a video conference. In another example, the virtual peripheral device 226N may be a virtual printer that allows the VM 220 to print documents. Each of the virtual peripheral devices 226A through 226N may be associated with a corresponding peripheral device 256A through 256B. The VM 220 may use a peripheral device associated with a virtual peripheral device to provide allow a user to perform functions, actions, and/or operations using the VM 220. For example, when the user prints to a virtual printer (e.g., virtual peripheral device 226N), the VM may send the data or document to the corresponding physical printer (e.g., peripheral device 256N).

VM 220 may be, for example, a hardware emulation, a full virtualization, a paravirtualization, and/or an operating system-level virtualization VM. Different VMs hosted by host machine 210 may have the same or different privilege levels for accessing different resources. It should be noted that functionality provided to client device 251A by VM 220 is not limited to virtual desktops and may include a wide variety of other server-based virtualization functions made available to the clients.

The guest OS and the VM 220 may be controlled by another operating system (not shown in the figures) of the host machine 210 (e.g., a host OS) that runs off of a hardware platform of the host machine 210. The host OS may execute a hypervisor 215 (also referred to as a virtual machine monitor (VMM)) for monitoring the hosted VM 220. The hypervisor 215 may be a software layer that emulates the underlying hardware of the host computer, making the use of the VM 220 transparent to the guest operating system and the user of the VM 220. A guest OS may be of the same or different type with respect to the host OS. For example, a guest OS may be a Windows™ operating system from Microsoft™ and a host OS may be a Linux™ operating system available from Red Hat, Inc.™. Although not shown in FIG. 2, the host machine 210 may include multiple VMs, and each VM may include its own guest OS.

In one embodiment, the host machine 210 may include the application 230 and may not include the VM 220 (as illustrated in FIG. 1A). For example, the host machine 210 may be a computing device such as a server that allows users to use the application 230 (e.g., an email application, a video conference application, a map application, etc.) but does not host VMs. In another embodiment, the host machine 210 may include the VM 220 and may not include the application 230 (as illustrated in FIG. 1B). For example, the host machine 210 may be a VM host that provide access to VMs, but does not allow users to use other applications on the host machine 210.

The host machine 210 includes an access protocol server 225. In one embodiment, the access protocol server 225 may work in tandem with one or more of the access protocol clients 255A through 255N to determine a most efficient place to process graphics to maximize an end user experience and minimize system load when the VM 220 is accessed by the client 251A. The primary client 251A may access the VM 220 (e.g., use the VM 220 to perform an operation or function) by communicating with the VM 220 via the access protocol server 225. In one embodiment, VM 220 communicates with the access protocol server 225 using a multi-channel protocol (e.g., Remote Desktop Protocol (RDP), Simple Protocol for Independent Computing Environments (SPICE), Virtual Network Computing (VNC), etc.) that allows for connection between VM 225 and peripheral devices 256A through 256N of the client devices 251A through 251N via access protocol clients 255A through 255N executing on the client devices 251A through 251N. The virtual peripheral devices 226A through 226N of the VM 220 may be virtual devices (e.g., virtual device drivers) or paravirtual devices (e.g., paravirtual device drivers) for the peripheral devices 256A through 256N to allow the VM 220 access to control and management functions of the peripheral devices 256A through 256N.

In another embodiment, the access protocol server 225 may work in tandem with one or more of the access protocol clients 255A through 255N when the application 230 is access is accessed by the client 251A. The primary client 251A may access the application 230 (e.g., use the application 230 to perform an operation or function) by communicating with the application 230 via the access protocol server 225. The primary client 251A may also access (e.g., use) the application 230 and/or may communicate with the application 230 directly (e.g., not using the access protocol server 225). In one embodiment, application 230 communicates with the access protocol server 225 using a multi-channel protocol (e.g., RDP, SPICE, VNC, etc.) that allows for connection between application 230 and peripheral devices 256A through 256N of the client devices 251A through 251N via access protocol clients 255A through 255N executing on the client devices 251A through 251N.

In one embodiment, the access protocol server 225 may store data that indicates which client device 251B through 251N is coupled to which peripheral device 256B through 256N. This may allow the access protocol server 225 to communicate device data to the appropriate access protocol client 255B through 255N via the appropriate communication channel.

The host machine 210 may be coupled to a host controller 240, via the network 205 or directly, that manages the VM 220 hosted by the host machine 210. In one embodiment, the host controller may include a VM manager 245. The VM manager 245 may monitor, manage, add, remove, configure and/or modify the VM 220 and/or the host 210. For example, VM manager 245 may add a new VM, remove an existing VM, change or reconfigure a VM (e.g., add/remove/replace virtual hardware), power on/off the host 20, provide directory service to the virtual machines 231, balance the load on a cluster of host machines that includes the host machine 210, and perform other management functions.

The client devices 251A through 251N each include a corresponding access protocol client 255A through 255N. In one embodiment, the access protocol clients 255A through 255N may each establish a communication channel with the access protocol server 225 and/or the application 230 (as illustrated above in FIG. 1B). This may allow the VM 220 and/or the application 230 to use, communicate with, or access the peripheral devices 256A through 256N that are coupled to the client devices 251A through 251N. For example, access protocol client 255A may communicate device data (e.g., data transmitted to, received from, or used to manage a peripheral device) using a communication channel between client device 251B and the access protocol server 225 and/or the application 230. In another embodiment, the access protocol clients 255B through 255N may each establish a communication channel with the client device 251A (as illustrated above in FIG. 1A). The access protocol client 255A may receive device data from the secondary client devices 251B through 251N (via access protocol clients 255B through 255N) and may forward the device data to the access protocol servers 225 and/or the application 230. The access protocol client 255A may also receive device data form the application 230 and/or the access protocol server 225 and may forward the device data to the appropriate access protocol client 255B through 255N. For example, the application may send device data for peripheral device 256N to access protocol client 255A. The access protocol client 255A may forward the device data for peripheral device 256N to the access protocol client 255N. In one embodiment, the access protocol client 255A may store data that indicates which client device 251B through 251N is coupled to which peripheral device 256B through 256N. This may allow the access protocol client 255A to forward device data to the appropriate access protocol client 255B through 255N.

In one embodiment, the access protocol server 225 may gather multiple disparate client devices 251A through 251N to form one logical client 250 to provide the peripheral devices 256A through 256N used to serve the virtual peripheral device configuration (e.g., the virtual peripheral devices 226A through 226N) of the VM 220 and/or used to serve the application 230. The access protocol server 225 may receive configuration data from the VM 220 and/or the application 230. The configuration data may include a list of virtual peripheral devices 226A through 226N used by the VM 220 (e.g., a virtual printer used by the VM 220). In one embodiment, the VM 220 may be instantiated based on the configuration data (e.g., instantiated with the list of peripheral devices listed in the configuration data). The configuration data may also include a list of peripheral devices that are associated with the logical client. For example, the configuration data may include a list of peripheral devices (e.g., a fingerprint reader, a CD-ROM drive, a GPS device, a web camera, etc.) that a user may want to include in the logical client (e.g., a user may select a list of peripheral devices using a graphical user interface). The configuration data may also include a list of peripheral devices used by the application 230 (e.g., a web camera used by a video conferencing application). The client device 251A may be established as the primary client device. The primary client device 251A may be the client device where a user of the VM 220 initially logs on to the VM 220 and initializes the VM 220. The primary client device 251A may also be the client device where the user access, uses, and/or initiates execution of the application 230. As part of establishing the primary client device 251A, the access protocol client 255A of the primary client device 251A authenticates with the access protocol server 225 and/or the application 230 and a connection session is established between these components.

In one embodiment, the primary client 251A may establish multiple communication channels with the VM 220 and/or the application 230. The primary client 251A may use the multiple communication channels to communicate (e.g., transmit and/or receive) different types of control data (e.g., use a first communication channel for mouse input, use a second communication channel for keyboard input, and use a third communication channel for monitor input) and/or device data for the peripheral device 256A. For example, the primary client 251A may communicate different types of control data using one or more communication channels (e.g., one channel for each type of control data, such as keyboard inputs, mouse inputs, etc.) and may also communicate device data using one or more additional communication channels (e.g., one communication channel per peripheral device)

Once the primary client device 251A is established, the access protocol server 225 may receive the virtual peripheral device configuration (e.g., configuration data indicating a list of virtual peripheral devices and/or a list of peripheral devices in a logical client) associated with the VM 220 from hypervisor 215 and/or may receive a list of devices used by the application 230 (e.g., configuration data). When the access protocol server 225 determines that the primary client device 251A is not coupled to corresponding physical peripheral devices, then the access protocol server 225 enables the addition of secondary client devices 215B through 251N to fulfill the peripheral devices for the VM 220 and/or the application 230.

In one embodiment, the access protocol server 225 may send a message to the access protocol client 255A informing the access protocol client 255A that additional peripheral devices can be configured for the VM 220 and/or that the application 230 uses additional peripheral devices. The access protocol client 255A may then inform the user that the VM 220 and/or the application 230 uses additional peripheral devices, and provide the user an option to select secondary client devices 251B through 251N for use of their peripheral devices 256B through 256N. In some embodiments, when the user indicates he or she would like to use peripheral devices 256B through 256N from the secondary client devices 251B through 251N, a user interface (UI), such as a management console, is presented to the user. Using the UI, the user of the VM 220 and/or the application 230 may identify one or more secondary client devices 251B through 251N each coupled to a peripheral device 256B through 256N. In another embodiment, the VM manager 245 may provide the user with the UI and communicates with the access protocol server 225 and other client devices 251A through 251N to configure the client devices 251A through 251N and/or the access protocol clients 255A through 255N.

Using the identification information provided by the user, the access protocol client 255A may then connect to the access protocol clients 255B through 255N of the identified secondary client devices 251B through 251N and authenticate the secondary client devices 251B through 251N. In other embodiments, the access protocol clients 255B through 255N of the secondary client devices 251B through 251N may contact the access protocol client 255A of the primary client device 251A to arrange for authentication and use of the peripheral devices 256B through 256N.

In other embodiments, the access protocol client 255A of the primary client device 251A may determine other secondary client devices 251B through 251N that are near the primary client device 251A (e.g., using IP address and other geographic markers) and suggest these client devices 251B through 251N to the user as potential secondary client devices. In yet further embodiments, the secondary client devices 251B through 251N to be used with primary client device 251A are pre-configured in the access protocol server 225 and/or the access protocol client 255A, and automatically connect as a logical client 250 upon initialization of the primary client device 251A.

In some embodiments, the authentication protocol used between the access protocol clients 255A through 255N is a proprietary authentication routine that is specialized for the access protocol implemented by access protocol server 225 and access protocol clients 255A through 255B. In one embodiment, once the access protocol clients 255A through 255N have been authenticated, a communication channel may be established between the access protocol server 225 and the client devices 251A through 250N. In another embodiment, once the access protocol clients 255A through 255N have been authenticated, communication channels may be established between the access protocol server 225 and the client devices 251A, and between each client device 251B through 251N and client device 251A. The access protocol server 225 may then group the client devices 251A through 250N as a logical client 250.

In some embodiments of the invention, the access protocol server 225 is aware of the logical client unit 250 and maintains a correspondence between each peripheral device used by the application 230 and/or the VM 220 and the access protocol clients 255A through 255N. As a result, instead of transmitting the device data to the primary client device 251A, the access protocol server 225 streams the different device data from the VM 220 and/or the application 230 to the particular access protocol client 255A through 255N coupled to the peripheral devices 256A through 256N. In other embodiments, the access protocol server 225 is unaware of the logical client 250. The access protocol server 225 may communicate (e.g., send and/or receive) data (e.g., control data and/or device data) with access protocol client 255A. The access protocol client 255A may forward the device data to the appropriate access protocol client 255B through 255N.

In one embodiment, the primary client device 251A is responsible for input devices (e.g., mouse, keyboard, touchscreen, etc.) and input device signals (e.g., control data) that may be used to control, manage, and/or access the VM 220 and/or the application 230. For example, the primary client device 251 may provide keyboard or mouse input that may control the functions and/or operations performed by the VM 220 (e.g., user may click on a folder, close an application window, initiate execution of an application on the VM 220, etc.). In another example, the primary client device 251 may control the functions and/or behavior of the application 230 (e.g., instruct an email application to check for new email, instruct a video conferencing application to end a video conference, etc.).

Figure 3:
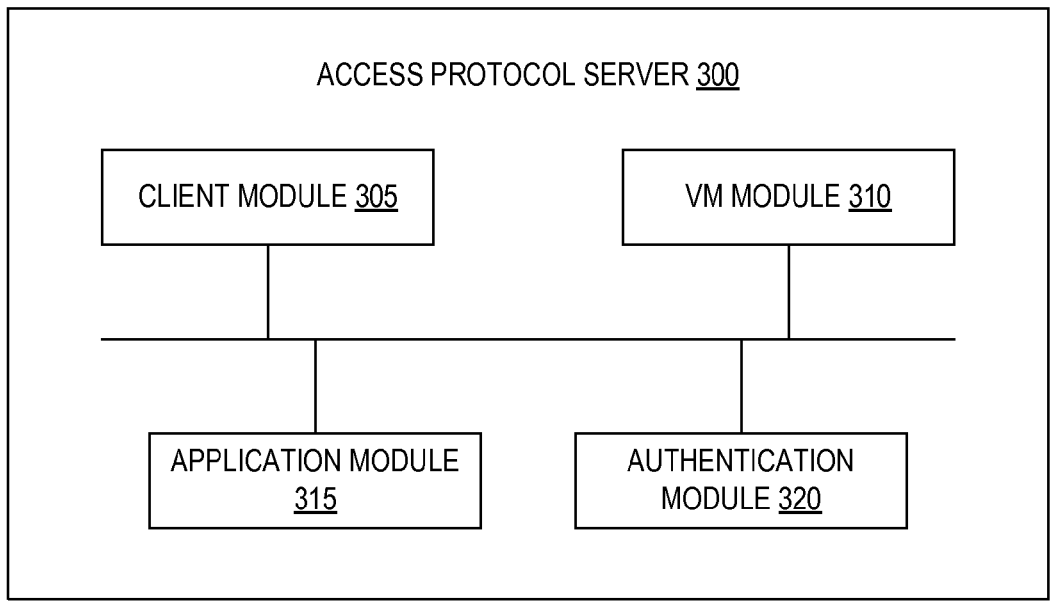
FIG. 3 is a block diagram illustrating an access protocol server, according to one embodiment.

FIG. 3 is a block diagram illustrating an access protocol server 300, according to one embodiment. The access protocol server 300 includes a client module 305, a VM module 310, an application module 315, and an authentication module 320. More or less components may be included in the access protocol server 300 without loss of generality. For example, two of the modules may be combined into a single module, or one of the modules may be divided into two or more modules. In one embodiment, one or more of the modules may reside on different computing devices (e.g., different desktop or laptop computers).

The client module 305 may communicate (e.g., send and/or receive) control data and/or device data with one or more access protocol clients (e.g., as illustrated in FIG. 2) in the client devices that are included in a logical client via communication channels. In one embodiment, the client module 305 may communicate control and/or device data with a single access protocol client on a primary client device of the logical client. For example, referring to FIG. 1A, the client module 305 may communicate control data and device data with the primary client device 115A. The primary client device 115A may forward the device data to access protocol clients on secondary client devices 115B through 115N. In another embodiment, the client module 305 may communicate control data with a single access protocol client on a primary client device and may also communicate device data with multiple protocol clients. For example, referring to FIG. 1B, the client module 305 may communicate control data with the primary client device 165A and may communicate device data with any of the clients devices 1656A through 165N. In another example, referring to FIG. 1B, the client module 305 may communicate device data with the appropriate one of the client devices 165A through 165N. The client module 305 may provide the control data and/or the device data to the VM module 310 and/or the application module 315. The client module 305 may also receive control data and/or device data from the VM module 310 and/or the application module 315.

The VM module 310 may communicate control data and/or device data with a VM that is executing on a host machine. For example, the VM module 310 may receive control data that indicates that a user has typed in text in a word processing application that is executing on the VM. The VM module 310 may provide the control data to the VM and the VM may perform an action, function, and/or operation based on the control data. For example, the VM may provide display a window or text, may initiate execution of an application, etc., based on the control data. The VM module 310 may also receive control data and/or device data from the VM and may provide the control data and/or the device data to the client module 305.

The application module 315 may communicate control data and/or device data with an application that is executing on a host machine. For example, the application module 315 may receive control data that indicates that a user wishes to perform a specific operation using the application. The application module 315 may provide the control data to the application and the application may perform an action, function, and/or operation based on the control data. For example, the application may initiate a video conference based on the control data. The application module 315 may also receive control data and/or device data from the application and may provide the control data and/or the device data to the client module 305. In one embodiment, the application that is executing on the host machine may not be aware of the logical client and one or more of the client module 305, the VM module 310, the application module 315, and the authentication module 320 may be part of the application (e.g., included in the application).

In one embodiment, the authentication module 320 may authenticate one or more of the client devices that are part of the logical client. For example, referring to FIG. 2, the authentication module 320 may request and/or receive credentials (e.g., username, password, etc.) from each client device 251A through 251N that is included in a logical client. The authentication module 320 may not include a client device (e.g., client device 251B) in the logical client if the credentials provided by the client device are not valid. The authentication module 320 may also authenticate the primary client device, before allowing the primary client device to access an application and/or a VM that is executing on the host machine.

Figure 4:
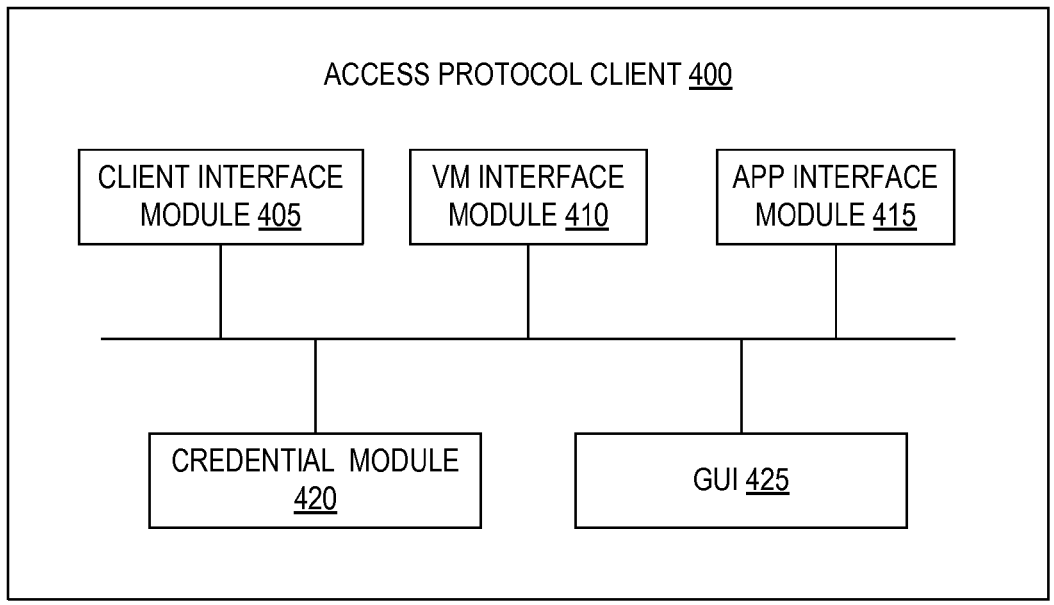
FIG. 4 is a block diagram illustrating access protocol client, according to one embodiment.

FIG. 4 is a block diagram illustrating access protocol client 400, according to one embodiment. The access protocol client 400 includes a client interface module 405, a VM interface module 410, an application interface module 415, an authentication module 420, and GUI 425. More or less components may be included in the access protocol server 400 without loss of generality. For example, two of the modules may be combined into a single module, or one of the modules may be divided into two or more modules. In one embodiment, one or more of the modules may reside on different computing devices (e.g., different desktop or laptop computers).

In one embodiment, the client interface module 405 may communicate (e.g., send and/or receive) device data with an access protocol client in another client device of a logical client (as illustrated in FIG. 2) using communication channels. For example, as illustrated in FIG. 1A, the client interface module 405 may communicate device data with the access protocol client in the primary client device 115A and the access protocol client in the primary client device 115A may forward the device data to a VM and/or an application on a host machine. The client interface module 405 may also transmit device data to the access protocol client in the primary client device 115A. In another example, as illustrated in FIG. 1A, the client interface module 405 may communicate device data with the access protocol clients in the secondary client devices 115B through 115N. The client interface module 305 may forward device data for a peripheral device to the appropriate secondary client device 115B through 115N (e.g., to the client device that is coupled to the peripheral device). The client interface module 405 may also establish communication channels with other access protocol clients on other client devices and may communicate device data using the communication channels.

The VM interface module 410 may communicate (e.g., send and/or receive) control data and/or device data with a VM that is executing on a host machine. For example, the access protocol client 400 may be the access protocol client for a primary client device. The VM interface module 410 may receive control data from a user that indicates that a user has printed a document to a virtual printer for a VM. The VM interface module 410 may provide the control data to the VM and the VM may perform an action, function, and/or operation based on the control data. The VM may send device data (e.g., data to control a physical printer) to the VM interface module 410 and the VM interface module 410 may provide the device data to the client interface module 405. The client interface module 405 may forward the device data to the appropriate client device in the logical client (e.g., the client device that is coupled to the physical printer).

The application interface module 415 may communicate (e.g., send and/or receive) control data and/or device data with an application that is executing on a host machine. For example, the access protocol client 400 may be the access protocol client for a primary client device. The application interface module 415 may receive control data from a user that indicates that a user started a video conference using a video conference application on a host. The application interface module 415 may provide the control data to the application and the application may perform an action, function, and/or operation based on the control data. The application may send device data (e.g., data to control a web camera) to the application interface module 415 and the application interface module 415 may provide the device data to the client interface module 405. The client interface module 405 may forward the device data to the appropriate client device in the logical client (e.g., the client device that is coupled to video camera).

In one embodiment, the credential module 420 may authenticate one or more of the client devices that are part of the logical client. For example, referring to FIG. 2, the credential module 420 may request and/or receive credentials (e.g., username, password, etc.) from each client device 251B through 251N that is included in a logical client. The credential module 420 may not include a client device (e.g., client device 251N) in the logical client if the credentials provided by the client device are not valid.

In one embodiment, the GUI 425 may provide a user interface (e.g., text, images, video, multi-media, buttons, text fields, radio buttons, drop down menus, file menus, a list box, a check box, a window, other user interface elements, widgets, and/or controls, etc.) to present data to a user and to receive user input. The GUI 425 may allow a user to select one or more secondary client devices to include in the logical client. For, example, the GUI 425 may present a list of secondary client devices and peripheral devices that are coupled to the secondary client devices. The GUI 425 may receive data indicating a selection of one or more of the secondary client devices and/or one or more peripheral devices. The access protocol client 400 may establish communication channels with the one or more secondary client devices and/or may provide the list of the one or more secondary client devices and/or peripheral devices to the VM and/or application, based on the user input received by the GUI 425.

Figure 5:
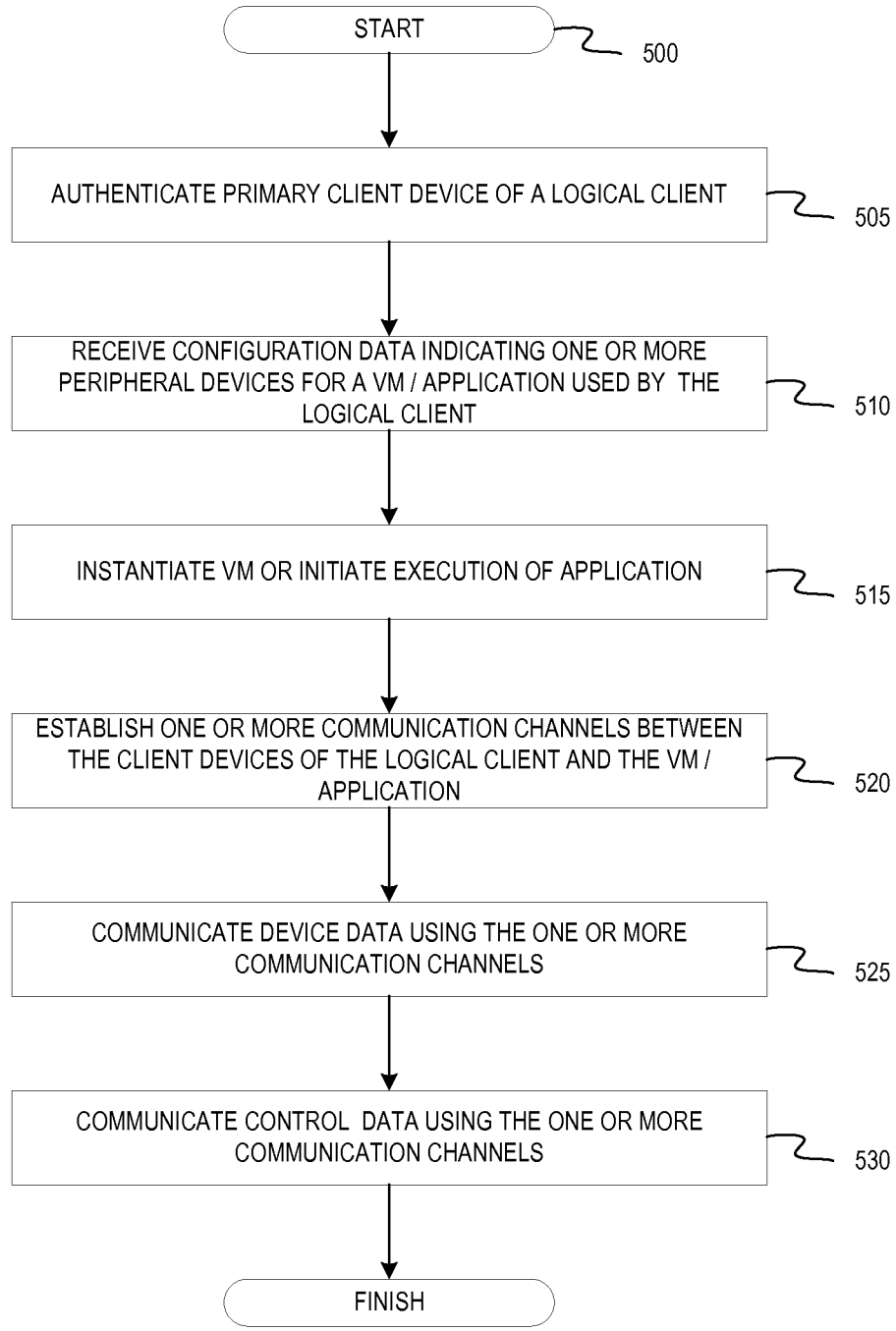
FIG. 5 is a flow diagram illustrating a method of accessing peripheral devices in a logical client, according to one embodiment.
Figure 6:
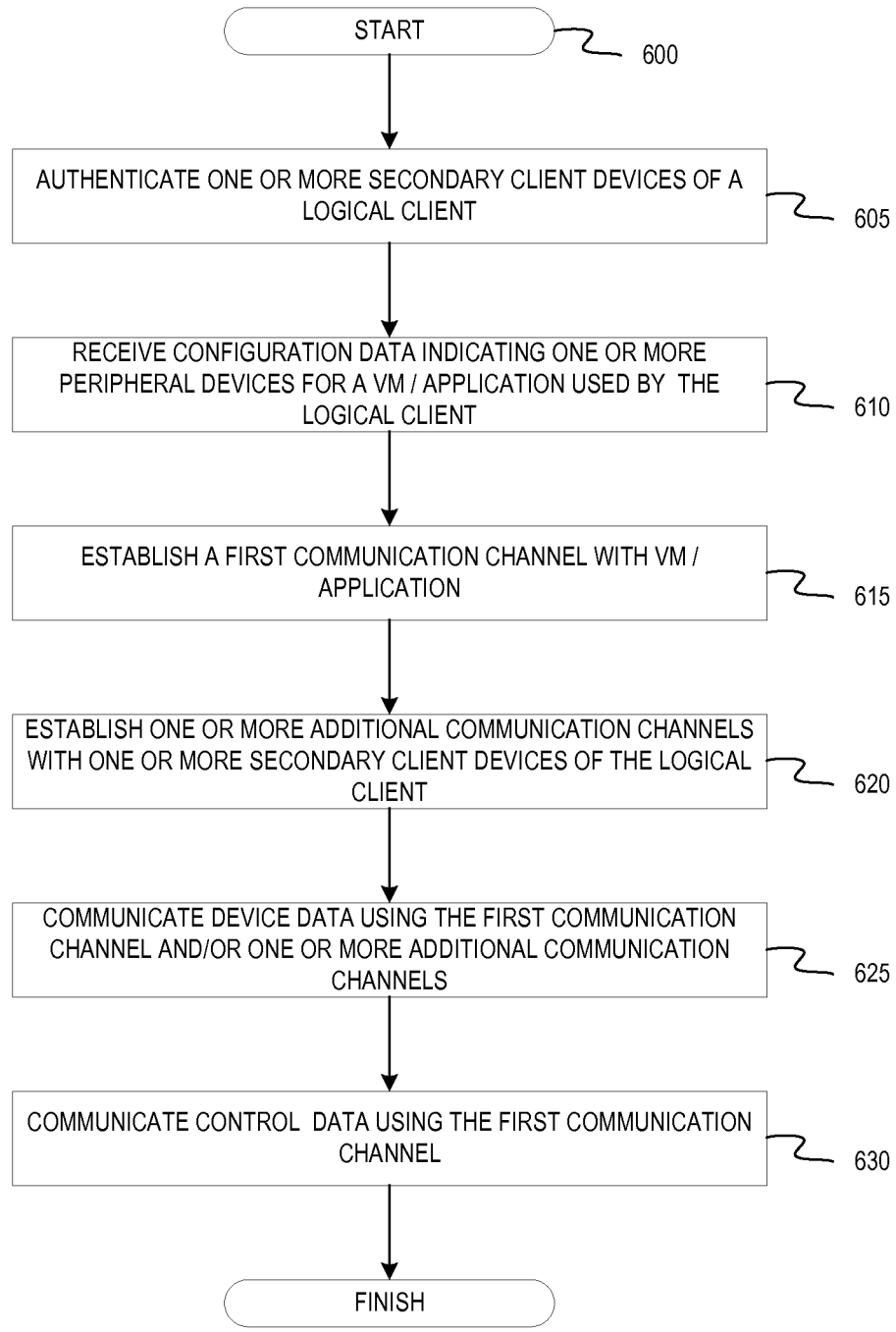
FIG. 6 is a flow diagram a method of accessing peripheral devices in a logical client, according to another embodiment.

FIGS. 5-6 are flow diagrams illustrating methods for accessing peripheral devices in a logical client. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method of accessing peripheral devices in a logical client, according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by an access protocol server as illustrated in FIGS. 2 and 3.

Referring to FIG. 5, the method 500 begins at block 505 where the method 500 authenticates the primary client device that is part of a logical client that includes additional secondary client devices. As discussed above, the primary client device may be the client device that controls, manages, and/or uses a VM and/or an application executing on a host machine. As discussed above, in one embodiment, the host machine may include the application and may not include the VM (e.g., the host machine is a server application that provides access to applications but does not host VMs). In another embodiment, the host machine may include the VM but may not include the application (e.g., the host machine hosts VMs but does not allow users to access or use other application son the host machine). At block 510 the method 500 receives configuration data indicating one or more peripheral devices for a logical client, a VM and/or an application that is used by the logical client. For example, the method 500 may receive a list of virtual peripheral devices that are part of a VM used by a logical client from a user, such as a system administrator that creates the VM using a host controller. In another example, the method 500 may receive a list of peripheral devices that are used by an application executing on a host machine (e.g., a list indicating that a video camera is used by a video conferencing application). In a further example, the method 500 may receive a list of peripheral devices that are included in a logical client. At block 515, the method 500 may instantiate the VM and/or initiate execution of the application that is used by the logical client, based on the configuration data. In one embodiment, block 515 may be optional if the VM is already instantiated or executing and/or the application is already executing.

At block 520, the method 500 establishes one or more communication channels between the client devices of the logical client, and the VM and/or application (e.g., between the client devices and the host machine that includes the VM and/or application). For example, the method 500 may establish communication channels between each secondary client device of the logical client and the primary client device of the logical client (as illustrated in FIG. 1A). In another example, the method 500 may establish a communication channel between each client device in the logical client (e.g., both primary and secondary client devices) and the VM and/or application (as illustrated in FIG. 1B). In one embodiment, the method 500 may not perform block 510. The method 500 may identify the peripheral devices used by an application and/or VM based on the data provided by each of the secondary client devices. For example, as the communication channels are established between each secondary client device and the primary client device, each secondary client may indicate which peripheral devices are coupled to the secondary client. In another example, the primary client device may be aware of the peripheral devices that are coupled to the secondary clients, prior to establishing the communication channel. For example, a user may select different secondary client devices using a GUI on the primary client device and the primary client device may be aware of the peripheral devices based on the user selections. At block 525, the method 500 may communicate device data using the one or more communication channels. For example, the method 500 may communicate device data to the primary client device via the communication channel between the primary client device and the VM and/or application. The primary client device may forward the device data to the appropriate secondary client device using a communication channel between the primary client device and the secondary client device. In another example, the method 500 may communicate device data directly to a secondary client device via a communication channel between the VM and/or application and the secondary client device. At block 530, the method 500 may communicate control data (e.g., data that is used manage, access, and/or control) the VM and/or application via a communication channel between the primary client device and the VM and/or application. After block 530, the method 500 ends.

FIG. 6 is a flow diagram a method of accessing peripheral devices in a logical client, according to another embodiment. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by an access protocol client as illustrated in FIGS. 2 and 4.

Referring to FIG. 6, the method 600 starts at block 605, where the method 600 authenticates one or more secondary client devices that are part of a logical client. For example, the method 600 may receive credentials (e.g., username, password, etc.) from one or more secondary client devices and may authenticate those credentials. At block 610, the method 600 may receive configuration data indicating one or more peripheral devices for a logical client and/or for a VM/application that is used by the logical client. For example, the method 600 may receive a list of virtual peripheral devices (e.g., a virtual printer, a virtual CD-ROM drive) that are part of a VM used by a logical client. In another example, the method 600 may receive a list of peripheral devices that are used by an application executing on a host machine (e.g., a list indicating that a fingerprint reader is used by an email application to authenticate a user). In a further example, the method 600 may receive a list of peripheral devices that are included in the logical client (e.g., a fingerprint reader, a CD-ROM drive, a GPS device, etc.).

At block 615, the method 600 may establish a first communication with a VM/application on a host machine (e.g., between a client device and the host machine that includes the VM and/or application). As discussed above, in one embodiment, the host machine may include the application and may not include the VM (e.g., the host machine is a server application that provides access to applications but does not host VMs). In another embodiment, the host machine may include the VM but may not include the application (e.g., the host machine hosts VMs but does not allow users to access or use other application son the host machine). The first communication channel may be between the VM/application, and a primary client device of the logical client (as illustrated in FIG. 1A). The method 600 may establish one or more additional communication channels with one or more secondary client devices of the logical client at block 620. For example, the method 600 may establish an second communication channel between the primary client device and a first secondary client device and may establish a third communication channel between the primary client device and a second secondary client device (as illustrated in FIG. 1A). At block 625, the method 600 may communicate device data using the first communication channel and/or one or more of the additional communication channels. For example, device data may be received on the first channel by the primary client device. The method 600 may forward the device data to the appropriate secondary client device via a corresponding communication channel between the primary client and the appropriate secondary client device. At block 630, the method 600 may communicate control data (e.g., data that is used manage, access, and/or control) the VM and/or application via a communication channel between the primary client device and the VM and/or application. After block 630, the method 600 ends.

Figure 7:
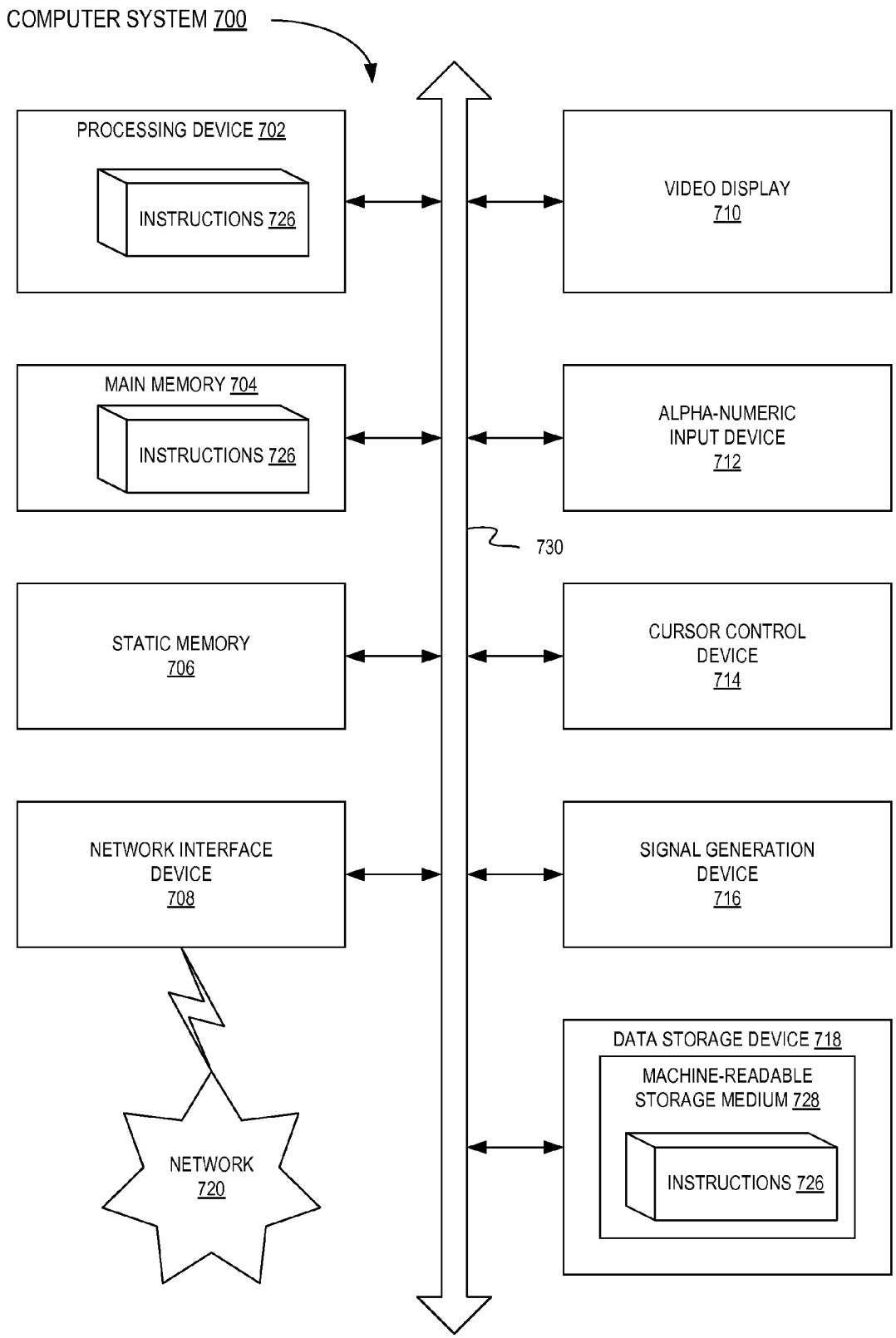
FIG. 7 is a block diagram of a machine in the example form of a computer system, in accordance with one embodiment.

FIG. 7 illustrates a diagrammatic representation of a computer system 700 in the example form of a computing device within which a set of instructions, for causing the machine to perform any one or more of the methodologies discussed herein, may be executed. The computer system 700 may be in the form of a computing device, such as a host machine, a client device, a server computer, etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 (e.g., instructions for the access protocol server and/or the access protocol client) for performing the operations and steps discussed herein.

The computer system 700 may further include a network interface device 708 which may communicate with a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable medium 728 on which is stored one or more sets of instructions (e.g., instructions 726 for the access protocol server and/or the access protocol client) embodying any one or more of the methodologies or functions described herein. The instructions 726 may (e.g., instructions for the access protocol server and/or the access protocol client) also reside, completely or at least partially, within the main memory 704 and/or within the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining," "establishing," "communicating," "sending," "receiving," "instantiating," "authenticating," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   obtaining, by a processing device of a virtual machine (VM) host executing an access protocol server, a list of virtual peripheral devices associated with a VM via a logical client, the logical client comprising a first client device and further comprising a second client device coupled to a first physical peripheral device corresponding to a first virtual peripheral device specified in the list of virtual peripheral devices, wherein the first client device is a primary client device that is accessible by an application on the VM and the second client device is a secondary client device that is accessible by the application via the first client device;
   receiving control data from the first client device via a first communication channel, the control data comprising data to initiate execution of the application;
   determining, by the access protocol server in view of the list of virtual peripheral devices, that the primary client device is unavailable to the first physical peripheral device;
   responsive to determining that the primary client device is unavailable to the first physical peripheral device, enabling, by the access protocol server, an access protocol client associated with the second client device coupled to the first physical peripheral device to allow the first physical peripheral device to receive device data associated with the execution of the application; and
   communicating the device data associated with the execution of the application by the first virtual peripheral device to the second client device via the first client device and a second communication channel, the device data comprising data to access the first physical peripheral device.

2. The method of claim 1, further comprising:
   communicating, by the processing device of the VM host, the device data between the VM host and a third client device via a third communication channel, wherein the VM is associated with a second virtual peripheral device, wherein the logical client further comprises the third client device, and wherein a second physical peripheral device is coupled to the third client device.

3. The method of claim 2, further comprising:
   receiving the device data from the second physical peripheral device via the third communication channel;
   sending the device data to the second virtual peripheral device of the VM;
   receiving additional device data from the second virtual peripheral device of the VM; and
   sending the additional device data to the second physical peripheral device via the third communication channel.

4. The method of claim 1, further comprising:
receiving the device data from the first physical peripheral device via the second communication channel;
sending the device data to the first virtual peripheral device of the VM;
receiving additional device data from the first virtual peripheral device of the VM; and
sending the additional device data to the first physical peripheral device via the second communication channel.

5. The method of claim 1, further comprising:
receiving the control data from the first client device via the first communication channel; and
sending the control data to the VM.

6. The method of claim 1, further comprising:
communicating, by the processing device of the VM host, the device data between a second virtual peripheral device and a second physical peripheral device, wherein the first client device is coupled to the second peripheral device, and wherein the VM uses the second virtual peripheral device.

7. The method of claim 1, further comprising:
authenticating one or more of the first client device or the second client device.

8. The method of claim 1, wherein the processing device is further to obtain a second list of peripheral devices associated with the logical client.

9. A system comprising:
a memory to store a list of virtual peripheral devices associated with a virtual machine (VM); and
a processing device executing an access protocol server, operatively coupled to the memory, the processing device to: obtain the first of virtual peripheral devices associated with the VM via a logical client, the logical client comprising a first client device and further comprising a second client device coupled to a first physical peripheral device corresponding to a first virtual peripheral device specified in the list of virtual peripheral devices, wherein the first client device is a primary client device that is accessible by an application on the VM and the second client device is a secondary client device that is accessible by the application via the first client device;
receive control data from the first client device via a first communication channel, the control data comprising data to initiate execution of the application;
determine, by the access protocol server in view of the list of virtual peripheral devices, that the primary client device is unavailable to the first physical peripheral device;
responsive to determining that the primary client device is unavailable to the first physical peripheral device, enable, by the access protocol server, an access protocol client associated with the second client device coupled to the first physical peripheral device to allow the first physical peripheral device to receive device data associated with the execution of the application; and
communicate the device data associated with the execution of the application by the first virtual peripheral device to the second client device via the first client device and a second communication channel, the device data comprising data to access the first physical peripheral device.

10. The system of claim 9, wherein the processing device is further to:
communicate the device data between the VM and a third client device via a third communication channel, wherein the VM is associated with a second virtual peripheral device, wherein the logical client further comprises the third client device, and wherein a second physical peripheral device is coupled to the third client device.

11. The system of claim 10, wherein the processing device is further to:
receive the device data from the second physical peripheral device via the third communication channel;
send the device data to the second virtual peripheral device of the VM;
receive additional device data from the second virtual peripheral device of the VM; and
send the additional device data to the second physical peripheral device via the third communication channel.

12. The system of claim 9, wherein the processing device is further to:
receive the device data from the first physical peripheral device via the second communication channel;
send the device data to the first virtual peripheral device of the VM;
receive additional device data from the first virtual peripheral device of the VM; and
send the additional device data to the first physical peripheral device via the second communication channel.

13. The system of claim 9, wherein the processing device is further to:
receive the control data from the first client device via the first communication channel; and
send the control data to the VM.

14. The system of claim 9, wherein the processing device is further to:
communicate the device data between a second virtual peripheral device and a second physical peripheral device, wherein the first client device is coupled to the second peripheral device, and wherein the VM uses the second peripheral device.

15. A non-transitory computer readable storage medium having, instructions that, when executed by a processing device, cause the processing device to:
obtain, by the processing device executing an access protocol server, a list of virtual peripheral devices associated with a virtual machine (VM) via a logical client, the logical client comprising a first client device and further comprising a second client device coupled to a first physical peripheral device corresponding to a first virtual peripheral device specified in the list of virtual peripheral devices, wherein the first client device is a primary client device that is accessible by an application on the VM and the second client device is a secondary client device that is accessible by the application via the first client device;
receive control data from the first client device via a first communication channel, wherein the control data comprises data to initiate execution of the application;
determine, by the access protocol server in view of the list of virtual peripheral devices, that the primary client device is unavailable to the first physical peripheral device;
responsive to determining that the primary client device is unavailable to the first physical peripheral device, enable, by the access protocol server, an access protocol client associated with the second client device coupled to the first physical peripheral device to allow the first physical peripheral device to receive device data associated with the execution of the application; and communicate the device data associated with the execution of the application by the first virtual peripheral device to the second client device via the first client device and a second communication channel, the device data comprising data to access the first physical peripheral device.

16. The non-transitory computer readable storage medium of claim 15, wherein the processing device is further to:
communicate the device data between the VM and a third client device via a third communication channel and the first communication channel, wherein the third communication is between the first client device and the third client device, wherein the VM is associated with a second virtual peripheral device, wherein the logical client further comprises the third client device, and wherein a second physical peripheral device is coupled to the third client device.

17. The non-transitory computer readable storage medium of claim 16, wherein the processing device is further to:
receive the device data from the second physical peripheral device via the third communication channel;
send the device data to the second virtual peripheral device of the VM via the first communication channel;
receive additional device data from the second virtual peripheral device of the VM via the first communication channel; and
send the additional device data to the second physical peripheral device via the third communication channel.

18. The non-transitory computer readable storage medium of claim 15, wherein the processing device is further to:
receive the device data from the first physical peripheral device via the second communication channel;
send the device data to the first virtual peripheral device of the VM via the first communication channel;
receive additional device data from the first virtual peripheral device of the VM via the first channel; and
send the additional device data to the first physical peripheral device via the second communication channel.

19. The non-transitory computer readable storage medium of claim 15, wherein the processing device is further to:
send the control data to the VM via the first communication channel.

20. The non-transitory computer readable storage medium of claim 15, wherein the processing device is further to:
communicate the device data between a second virtual peripheral device and a second physical peripheral device, wherein the first client device is coupled to the second peripheral device, and wherein the VM uses the second peripheral device.

21. The non-transitory computer readable storage medium of claim 15, wherein the processing device is further to:
authenticate at least one of the first client device or the second client device.

* * * * *